United States Patent
Peeters et al.

(10) Patent No.: US 10,053,085 B2
(45) Date of Patent: Aug. 21, 2018

(54) METHOD AND CONTROL UNIT TO CONTROL A DRIVETRAIN

(71) Applicant: ZF Friedrichshafen AG, Friedrichshafen (DE)

(72) Inventors: Joost Peeters, Friedrichshafen (DE); Felix Klünder, Ravensburg (DE); Anton Fritzer, Markdorf (DE); Florian Mayer, Amtzell (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 43 days.

(21) Appl. No.: 15/386,719

(22) Filed: Dec. 21, 2016

(65) Prior Publication Data

US 2017/0174208 A1 Jun. 22, 2017

(30) Foreign Application Priority Data

Dec. 21, 2015 (DE) .................. 10 2015 226 119

(51) Int. Cl.
*B60W 10/08* (2006.01)
*B60W 20/40* (2016.01)
(Continued)

(52) U.S. Cl.
CPC ............ *B60W 20/40* (2013.01); *B60K 6/387* (2013.01); *B60K 6/547* (2013.01); *B60W 10/06* (2013.01);
(Continued)

(58) Field of Classification Search
CPC ..... B60W 30/192; B60W 10/06; B60W 10/08
See application file for complete search history.

(56) References Cited

U.S. PATENT DOCUMENTS

| 7,426,972 B2 | 9/2008 | Tabata et al. |
| 8,452,469 B2 | 5/2013 | Otokawa |

(Continued)

FOREIGN PATENT DOCUMENTS

| DE | 102010000860 A1 | 7/2001 |
| DE | 102005036518 A1 | 2/2006 |
| WO | WO 2009109822 A1 | 9/2009 |

OTHER PUBLICATIONS

German Search Report DE102015226119.0, dated Sep. 20, 2016. (8 pages).

*Primary Examiner* — Derek D Knight
(74) *Attorney, Agent, or Firm* — Dority & Manning, P.A.

(57) ABSTRACT

A method for operating a drive train of a motor vehicle includes closing a frictional-locking shift element that serves as a starting element of a transmission in a slipping manner such that slip at the frictional-locking shift element is reduced by a defined pressure control of the frictional-locking shift element, determining a differential rotational speed at the frictional-locking shift element or a variable dependent on the differential rotational speed while the frictional-locking shift element is closing, and, when the differential rotational speed or the variable dependent on the differential rotational speed is less than a first limit value or reaches the first limit value, changing a rotational speed of the drive unit in such a manner that the differential rotational speed or the variable dependent on the differential rotational speed becomes less than a second limit value or reaches the second limit value within a defined time period.

8 Claims, 1 Drawing Sheet

(51) Int. Cl.

| | | |
|---|---|---|
| *F02N 11/08* | (2006.01) | |
| *F02N 15/10* | (2006.01) | |
| *B60K 6/387* | (2007.10) | |
| *B60K 6/547* | (2007.10) | |
| *B60W 10/06* | (2006.01) | |
| *B60W 10/11* | (2012.01) | |
| *B60W 30/18* | (2012.01) | |
| *B60W 20/10* | (2016.01) | |
| *B60W 20/15* | (2016.01) | |
| *B60K 6/48* | (2007.10) | |
| *B60W 30/20* | (2006.01) | |

(52) U.S. Cl.
CPC ............ *B60W 10/08* (2013.01); *B60W 10/11* (2013.01); *B60W 20/10* (2013.01); *B60W 20/15* (2016.01); *B60W 30/18027* (2013.01); *F02N 11/0848* (2013.01); *F02N 11/0851* (2013.01); *F02N 15/10* (2013.01); *B60K 2006/4825* (2013.01); *B60W 2030/206* (2013.01); *B60W 2510/104* (2013.01); *B60W 2510/1015* (2013.01); *B60W 2710/0644* (2013.01); *B60W 2710/081* (2013.01); *B60W 2710/1011* (2013.01); *B60W 2710/1083* (2013.01)

(56) References Cited

U.S. PATENT DOCUMENTS

| | | | |
|---|---|---|---|
| 9,217,503 B2 | 12/2015 | Herbeth et al. | |
| 2008/0245332 A1* | 10/2008 | Rimaux | B60K 6/48 |
| | | | 123/179.24 |

* cited by examiner

METHOD AND CONTROL UNIT TO CONTROL A DRIVETRAIN

FIELD OF THE INVENTION

The invention relates generally to a method for operating a drive train of a motor vehicle. The invention also relates generally to a control device for operating a drive train of a motor vehicle.

BACKGROUND

A drive train of a motor vehicle has a drive unit, a transmission and an output, whereas the transmission is connected between the drive unit and the output. The transmission converts rotational speeds and torques, and thus provides the pulling power effort of the drive unit at the output. In order to start a motor vehicle, a starting element is closed, whereas the starting element to be closed typically comprises a frictional-locking shift element of the transmission, which, for starting, is closed in a slipping manner such that, during the closing process, the slip at the frictional-locking shift element serving as the starting element is reduced by a defined pressure control of the shift element until the frictional-locking shift element is completely closed and the slip thereon is completely degraded. Accordingly, during the starting process, the slip or a differential rotational speed at the frictional-locking shift element serving as the starting element is reduced. Upon the reduction of the differential rotational speed at the starting element, a resonance-critical range of rotational speeds is passed through. For this purpose, during the starting process, the drive train can be excited to form resonance vibrations, which causes an undesirable longitudinal vibration and undesirable noises.

WO 2009/109822 A1 discloses a method for operating a drive train of a hybrid vehicle, whereas the drive unit of the hybrid vehicle comprises an internal combustion engine and an electric motor, whereas a holding element formed as a frictional-locking clutch is connected between the internal combustion engine and the electric motor. In order to avoid vibrations and noises that may arise from resonances, it is proposed, according to this state of the art, to stop the internal combustion engine while the holding element, which is connected between the internal combustion engine and the electric motor, is engaged.

A control device for a vehicle drive system is known from DE 10 2005 036 518 A1. According to this state of the art, when the internal combustion engine is stopped, it is proposed to reduce resonance phenomena by lowering the rotational speed of an electric motor, in order to rapidly reduce the rotational speed of the internal combustion engine through a predetermined range of the resonance rotational speeds.

SUMMARY OF THE INVENTION

Exemplary aspects of this invention provide a method for operating a drive train and a control device for carrying out the method, with the assistance of which resonance vibrations during start-up are reduced.

In accordance with exemplary aspects of the invention, during the closing process of the frictional-locking shift element serving as the starting element, the differential rotational speed at the frictional-locking shift element serving as the starting element or a variable dependent on the differential rotational speed is determined, whereas, if the differential rotational speed or the variable dependent on the differential rotational speed is less than a first limit value or reaches the first limit value, the rotational speed of the drive unit is changed in such a manner that, within a defined time period, the differential rotational speed or the variable dependent on the differential rotational speed becomes less than a second limit value or reaches the second limit value, whereas the second limit value is less than the first limit value.

Through the influencing in accordance with exemplary aspects of the invention of the rotational speed of the drive unit during a starting operation, it is possible to minimize the retention time of the differential rotational speed of the frictional-locking shift element of the transmission serving as the starting element in the resonance-critical range of rotational speeds. As a result, the drive train is excited to vibrate only during a very short period of time, whereas such excitation is too short to cause longitudinal vibrations or acoustic noise.

Preferably, the rotational speed of the drive unit is changed in such a manner that the differential rotational speed or the variable dependent on the same is changed, within a minimum time period, from the first limit value in the direction of the second limit value. This can be particularly effective in counteracting the undesirable formation of longitudinal vibrations and acoustic noises during the starting process.

According to a first additional form, with an electrical vehicle, the drive unit of which is an electric motor, or with a hybrid vehicle, the drive unit of which includes an electric motor, the electric motor is used for starting, whereas if, during the closing process of the frictional-locking shift element serving as the starting element, the differential rotational speed or the variable dependent on the differential rotational speed becomes less than the first limit value or reaches the first limit value, the rotational speed of the electric motor is changed by a specification of the rotational speed for the same. If, during the starting process, the drive element is provided by an electric motor, a specification of the rotational speed for the electric motor is changed in order to minimize the retention time of the differential rotational speed of the frictional-locking shift element serving as the starting element, in the resonance-critical range of rotational speeds.

According to a second additional form, with a vehicle, the drive unit of which is an internal combustion engine, or with a hybrid vehicle, the drive unit of which includes an internal combustion engine, the internal combustion engine is used for starting, whereas if, during the closing process of the frictional-locking shift element serving as the starting element, the differential rotational speed or the variable dependent on the differential rotational speed becomes less than the first limit value or reaches the first limit value, the rotational speed of the internal combustion engine is changed by a specification of the load for the same. If, during the starting process, the drive torque is provided by an internal combustion engine, during the starting process, a load specification for the internal combustion engine is changed, in order to minimize the retention time of the differential rotational speed of the frictional-locking shift element serving as the starting element, in the resonance-critical range of rotational speeds.

BRIEF DESCRIPTION OF THE DRAWINGS

Preferential additional forms arise from the sub-claims and the following description. Embodiments of the inven

DETAILED DESCRIPTION

Figure 1:
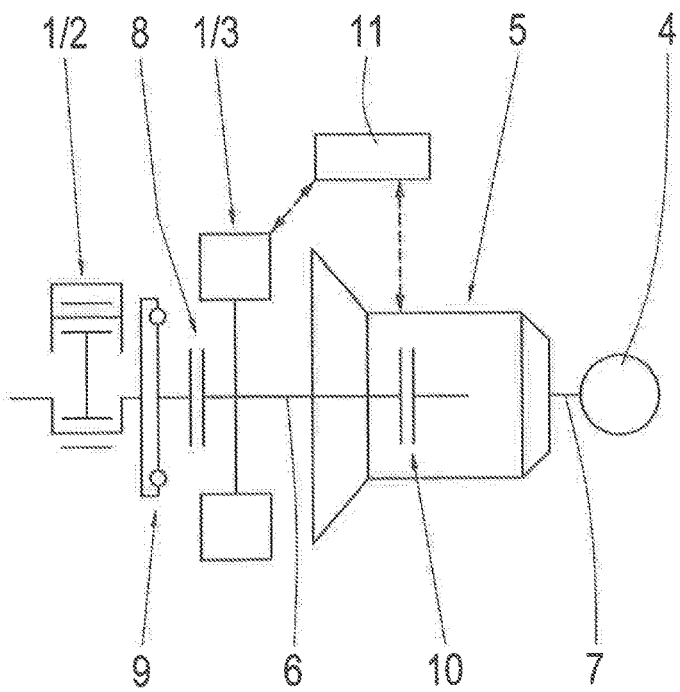
- FIG. 1 is a diagram of a drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In the following, exemplary aspects of the invention are described in detail with reference to FIGS. 1 and 2, whereas FIG. 1 schematically shows a drive train of a motor vehicle formed as a hybrid vehicle. A drive unit 1 of the drive train shown in FIG. 1 comprises an internal combustion engine 2 along with an electric motor 3, whereas a transmission 5 is connected between the drive unit 1 and an output 4.

With the drive train of FIG. 1, the electric motor 3 acts on a transmission input shaft 6 of the transmission 5, whereas the internal combustion engine 2 also acts on the transmission input shaft 6 of the transmission 5, whereas, however, the internal combustion engine 2 can be decoupled from the transmission input shaft 6 by the separating clutch 8. When the separating clutch 8 is open, the internal combustion engine 2 is decoupled from the transmission input shaft 6; however, when the separating clutch 8 is closed, the internal combustion engine 2 is coupled to the transmission input shaft 6 of the transmission 5.

A vibration damper 9 is also connected between the internal combustion engine 2 and the separating clutch 8 as shown in FIG. 1.

Accordingly, with the drive train of FIG. 1, the internal combustion engine 2 and the electric motor 3 of the drive unit 1 both act on the transmission input shaft 6 of the transmission 5. The output 4 is coupled to a transmission output shaft 7 of the transmission 5.

The transmission 5 comprises multiple shift elements, whereas, in each engaged gear, a first number of shift elements is open and a second number of shift elements is closed.

For starting, a frictional-locking shift element 10 of the transmission 5 serves as the starting element, which, for starting, is closed in a slipping manner, specifically, in such a manner that, during the starting process or slipping closing process, a slip on the frictional-locking shift element 10 serving as the starting element is reduced or degraded through a defined pressure control of the shift element 10, preferably until the differential rotational speed at the frictional-locking shift element 10 serving as the starting element has been completely degraded, and such element is then completely closed.

Details of a pressure control for the frictional-locking shift element 10 are familiar to the expert addressed herein and require little further explanation.

FIG. 1 also shows a control device 11, which serves to control the electric motor 3 of the drive unit 1 and to control the transmission 5. This control device 11 may comprise a transmission control device or a hybrid control device.

In the following, it is to be assumed that, for the starting of the drive train shown in FIG. 1, the electric motor 3 is used, and that, for starting, the electric motor 3 provides the required drive torque at the transmission input shaft 6. In this case, the separating clutch is then preferably opened, and the internal combustion engine 2 is decoupled from the transmission input shaft 6.

Figure 2:
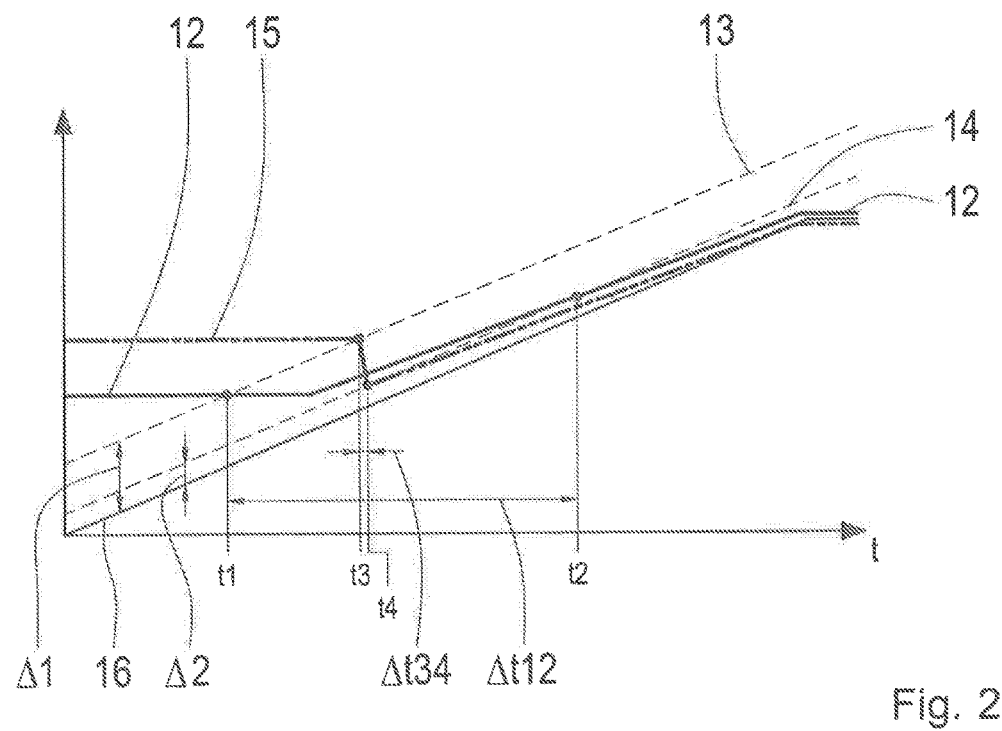
FIG. 2 is a diagram for illustrating the method in accordance with exemplary aspects of the invention for operating a drive train of a motor vehicle.

FIG. 2 shows several chronological curve progressions over time t for a starting process.

Thus, the curve progression 12 corresponds to a rotational speed progression for the electric motor 3 used for starting, as it is used in the state of the art. This rotational speed progression 12 of the electric motor 3 accordingly comprises the rotational speed progression that, on the drive side or on the primary side, applies at the frictional-locking shift element 10 serving as the starting element.

As already stated, during the starting process, the frictional-locking shift element 10 is controlled with a defined pressure control, whereas, in FIG. 2, a curve progression 16 visualizes the progression of the rotational speed of the frictional-locking shift element 10 on the output side, and thus on the secondary side, which is adjusted as a result of the pressure control for the frictional-locking shift element 10 on the same on the output side, and thus on the secondary side.

Prior to the point in time t1, the rotational speed of the frictional-locking shift element 10 on the drive side, and thus the primary side, is constant in accordance with the curve progression 12, and the rotational speed on the secondary side or output side increases in accordance with the curve progression 16 as a consequence of the pressure control for the frictional-locking shift element 10, such that the slip or a differential rotational speed at the frictional-locking shift element 10 that serves as the starting element is degraded.

A resonance-critical range of rotational speeds for the frictional-locking shift element 10 is defined by the curve progressions 13 and 14, in which the drive train can be excited to form resonances, and thus longitudinal vibrations or acoustic noises. The distance Δ1 indicates the distance of the rotational speed 16 of the frictional-locking shift element 10 on the secondary side or output side from an upper limit 13, and the distance Δ2 visualizes the distance of the rotational speed 16 of the frictional-locking shift element 10 on the output side or secondary side from a lower limit 14 of such resonance-critical range of rotational speeds.

In FIG. 2, at the point in time t1, the differential rotational speed at the frictional-locking shift element 10 serving as the starting element reaches a first limit value, which is defined by the upper limit 13 of the resonance-critical range of rotational speeds, whereas, with the use of the rotational speed progression 12 known from the state of the art, the differential rotational speed at the frictional-locking shift element 10 leaves this resonance-critical range of rotational speeds only at the point in time t2, such that, according to the state of the art, the drive train accordingly can be excited to form resonance vibrations during the time interval Δt12, since, during the time period Δt12, the differential rotational speed at the frictional-locking shift element 10 that serves as the starting element is located in the resonance-critical range of rotational speeds defined by the limit values 13 and 14. This can cause longitudinal vibrations and noise in the drive train.

In order to reduce the retention time of the differential rotational speed at the frictional-locking shift element 10 of the transmission 5 serving as the starting element, in accordance with exemplary aspects of the invention, it is proposed that, during the starting process, and thus during the closing process, of the frictional-locking shift element 10 serving as the starting element, the differential rotational speed at the frictional-locking shift element 10 serving as the starting element or a variable dependent on such differential rotational speed is determined, whereas, if such differential rotational speed or the variable dependent on such differential rotational speed is less than a first limit value or reaches the first limit value, the rotational speed of the drive unit (in the embodiment shown, the rotational speed of the electric motor 3) is changed to such an extent that, within a defined time period, the differential rotational speed or the variable dependent on the differential rotational speed is less than a second limit value or reaches the second limit value, whereas the second limit value is less than the first limit value.

FIG. 2 also shows, in addition to the rotational speed progression 12 of the electric motor 3 that is known from the state of the art, a curve progression 15 in accordance with exemplary aspects of the invention, which visualizes the rotational speed of the electric motor 3 during the starting process within the meaning of the invention.

If, at the point in time t3, the differential rotational speed at the starting element or the frictional-locking clutch 10, or a variable dependent on the differential rotational speed, reaches the first limit value (thus, it intersects the upper limit 13 of the range of rotational speeds critical to the differential speed), the rotational speed of the drive unit (specifically, the electric motor 3) is changed (specifically, reduced) in such a manner that, during the defined time period Δt34, which is defined by the points in time t3 and t4, the differential rotational speed at the starting element or at the frictional-locking shift element 10 reaches or falls below the second limit value, which is represented by the lower limit 14 of the range of rotational speeds critical to the differential rotational speed. The pressure control of the shift element 10 remains unchanged compared to the state of the art, such that no change to the rotational speed 16 on the output side arises.

As a result of the reduction in the rotational speed of the electric motor 3 in accordance with exemplary aspects of the invention, the retention time of the differential rotational speed of the starting element or the frictional-locking shift element 10 in the range of rotational speeds critical to the differential rotational speed accordingly amounts to only the time period Δt34, which is significantly shorter than the time period Δt12, which would form according to the state of the art and for which, according to the state of the art, the differential rotational speed at the starting element or the shift element 10 would remain in the resonance-critical range of rotational speeds. The time period Δt34, which is adjusted according to exemplary aspects of the invention and for which the differential rotational speed at the starting element 10 according to exemplary aspects of the invention remains in the resonance-critical range of rotational speeds, is so small that the motor vehicle cannot be excited to form longitudinal vibrations. Furthermore, undesired acoustic noises are not able to form in the drive train.

If, as described with reference to FIGS. 1 and 2, the electric motor 3 is used for the starting operation, and if, during the closing process of the frictional-locking shift element 10 serving as the starting element, the differential rotational speed or the variable dependent on the differential rotational speed is less than the first limit value or reaches the first limit value, the rotational speed of the electric motor 3 is changed by a specification of the rotational speed for the same, preferably in such a manner that the differential rotational speed or the variable dependent on the differential rotational speed changes within a minimum time period from the first limit value in the direction of the second limit value.

Exemplary aspects of the invention can also be used if the internal combustion engine 2, but not the electric motor 3, is used for the starting process. In this case, if, during the closing process of the frictional-locking shift element 10 serving as the starting element, and thus during the starting process, the differential rotational speed at the frictional-locking shift element 10 serving as the starting element or the variable dependent on such differential rotational speed is less than the first limit value or reaches the first limit value, the rotational speed of the internal combustion engine 2 is changed by a specification of the load, in order to, within a minimal time period, in turn change the differential rotational speed at the starting element from the first limit value in the direction of the second limit value.

The method according to exemplary aspects of the invention is carried out by the control device 11. The control device 11 assumes the control-side design, thus, the control of the assembly units involved in the method according to exemplary aspects of the invention, thus, the starting element or the frictional-locking shift element 10 of the transmission 5 and of the drive unit 1, and, in the embodiment of FIGS. 1 and 2, the electric motor 3. During the closing process, and thus during the start-up process, the control device 11 determines the differential rotational speed, formed at the starting element or at the frictional-locking shift element 10, between the rotational speed of the shift element 10 on the drive side or primary side, and the rotational speed of the shift element 10 on the output side or secondary side. If the differential rotational speed or a variable dependent on the differential rotational speed is less than a first limit value or reaches the first limit value, the control device 11 controls the drive unit 1 (specifically, the electrical machine 3 in the embodiment of FIGS. 1 and 2), in such a manner that, within a defined time period, the differential rotational speed or the variable dependent on the differential rotational speed is less than the second limit value or reaches the second limit value, whereas the second limit value is less than the first limit value. The control device 11, which preferably comprises an electronic transmission control device or an electronic hybrid control device, performs the method in accordance with exemplary aspects of the invention by controlling the participating assembly units.

Modifications and variations can be made to the embodiments illustrated or described herein without departing from the scope and spirit of the invention as set forth in the appended claims.

REFERENCE SIGNS

1 Drive unit
2 Internal combustion engine
3 Electric motor
4 Output
5 Transmission
6 Transmission input shaft
7 Transmission output shaft
8 Separating clutch
9 Vibration damper
10 Shift element/starting element
11 Control device
12 Curve progression
13 First limit value
14 Second limit value 15 Curve progression
16 Curve progression

The invention claimed is:

1. A method for operating a drive train of a motor vehicle having a drive unit, a transmission and an output, the method comprising:
   closing a frictional-locking shift element that serves as a starting element of the transmission in a slipping manner such that slip at the frictional-locking shift element is reduced by a defined pressure control of the frictional-locking shift element;
   determining a differential rotational speed at the frictional-locking shift element or a variable dependent on the differential rotational speed while the frictional-locking shift element is closing; and
   when the differential rotational speed or the variable dependent on the differential rotational speed is less than a first limit value or reaches the first limit value, changing a rotational speed of the drive unit in such a manner that the differential rotational speed or the variable dependent on the differential rotational speed becomes less than a second limit value or reaches the second limit value within a defined time period, the second limit value being less than the first limit value.

2. The method of claim 1, wherein changing the rotational speed of the drive unit comprises changing the rotational speed of the drive unit such that the differential rotational speed or the variable dependent on the same changes from the first limit value in the direction of the second limit value within a minimum time period.

3. The method of claim 1, wherein the drive unit comprises an electric motor, changing the rotational speed of the drive unit comprising changing the rotational speed of the electric motor by a specification of the rotational speed for the electric motor when the differential rotational speed or the variable dependent on the differential rotational speed becomes less than the first limit value or reaches the first limit value.

4. The method of claim 1, wherein the drive unit comprises an internal combustion engine, changing the rotational speed of the drive unit comprising changing the rotational speed of the internal combustion engine by a specification of the load for the internal combustion engine when the differential rotational speed or the variable dependent on the differential rotational speed becomes less than the first limit value or reaches the first limit value.

5. A control device for operating a drive train of a hybrid vehicle with a drive train with a drive unit, a transmission and an output, the control device configured to dose a frictional-locking shift element that serves as a starting element of the transmission in a slipping manner such that slip at the frictional-locking shift element is reduced by a defined pressure control of the frictional-locking shift element, determine a differential rotational speed at the frictional-locking shift element or a variable dependent on the differential rotational speed while the frictional-locking shift element is closing, and, when the differential rotational speed or the variable dependent on the differential rotational speed is less than a first limit value or reaches the first limit value, change a rotational speed of the drive unit in such a manner that the differential rotational speed or the variable dependent on the differential rotational speed becomes less than a second limit value or reaches the second limit value within a defined time period,
   wherein the second limit value is less than the first limit value.

6. The control device of claim 5, wherein the control device is configured to change the rotational speed of the drive unit such that the differential rotational speed or the variable dependent on the same changes from the first limit value in the direction of the second limit value within a minimum time period.

7. The control device of claim 5, wherein the drive unit comprises an electric motor, the control device configured to change the rotational speed of the drive unit by changing the rotational speed of the electric motor by a specification of the rotational speed for the electric motor when the differential rotational speed or the variable dependent on the differential rotational speed becomes less than the first limit value or reaches the first limit value.

8. The control device of claim 5, wherein the drive unit comprises an internal combustion engine, the control device configured to change the rotational speed of the drive unit by changing the rotational speed of the internal combustion engine by a specification of the load for the internal combustion engine when the differential rotational speed or the variable dependent on the differential rotational speed becomes less than the first limit value or reaches the first limit value.

* * * * *